(12) United States Patent
Kawakita et al.

(10) Patent No.: US 11,711,150 B2
(45) Date of Patent: Jul. 25, 2023

(54) OPTICAL COMMUNICATION SYSTEM AND OPTICAL COMMUNICATION METHOD

(71) Applicant: NIPPON TELEGRAPH AND TELEPHONE CORPORATION, Tokyo (JP)

(72) Inventors: Atsuko Kawakita, Musashino (JP); Kazutaka Hara, Musashino (JP); Yasutaka Kimura, Musashino (JP); Kenji Horikawa, Musashino (JP); Hiroyuki Furukawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 61 days.

(21) Appl. No.: 17/437,925

(22) PCT Filed: Mar. 6, 2020

(86) PCT No.: PCT/JP2020/009558
§ 371 (c)(1),
(2) Date: Sep. 10, 2021

(87) PCT Pub. No.: WO2020/189320
PCT Pub. Date: Sep. 24, 2020

(65) Prior Publication Data
US 2022/0173813 A1    Jun. 2, 2022

(30) Foreign Application Priority Data

Mar. 20, 2019 (JP) ................................ 2019-052094

(51) Int. Cl.
*H04B 10/272* (2013.01)
*H04B 10/572* (2013.01)
(Continued)

(52) U.S. Cl.
CPC ........... *H04B 10/572* (2013.01); *G02B 6/287* (2013.01); *H04B 10/272* (2013.01); *H04B 10/506* (2013.01); *H04J 14/0204* (2013.01)

(58) Field of Classification Search
CPC ................ H04B 10/572; H04B 10/272; H04B 10/506; H04B 10/50; H04B 10/43; H04B 10/29;
(Continued)

(56) References Cited

U.S. PATENT DOCUMENTS

2002/0122244 A1 * 9/2002 Sotgiu ................. H01S 3/06754
359/341.3
2015/0085297 A1 * 3/2015 Hughes ................. G01S 7/497
356/482

(Continued)

OTHER PUBLICATIONS

Atsuko Kawakita et al., Long-Reach Optical Access Networks by Splitting Ratio Determination Process with Unsymmetrical Optical Splitter, 2018 IEICE Society Conference, Sep. 11, 2018.
(Continued)

*Primary Examiner* — Hibret A Woldekidan
(74) *Attorney, Agent, or Firm* — Harness, Dickey & Pierce, P.L.C.

(57) ABSTRACT

An object is to provide an optical communication system and an optical communication method that are capable of, when assigning wavelengths on a per-service basis and providing services on a per-area basis, preventing degradation of signal quality due to linear crosstalk and preventing an increase in cost and size. An optical communication system according to the present invention includes an optical splitter 300 connecting N first ports and M second ports by a combination of 2×2 fiber optical splitters, N and M each being an integer of two or more, where wavelengths of optical signals to be received are limited for each group of optical receivers 106, by using a correlation between a fused extension length of at least one 2×2 fiber optical splitter (Continued)

directly connected to the first port, among the 2×2 fiber optical splitters, and wavelength output characteristics of the second port of the optical splitter 300.

9 Claims, 6 Drawing Sheets

(51) Int. Cl.
*G02B 6/287* (2006.01)
*H04B 10/50* (2013.01)
*H04J 14/02* (2006.01)

(58) Field of Classification Search
CPC ...... H04B 10/27; H04B 10/278; G02B 6/287;
G02B 6/2938; G02B 6/29332; H04J
14/0204; H04J 14/02; H04J 14/0221;
H04Q 11/00
USPC .......................... 398/79, 82, 66, 69, 70, 71
See application file for complete search history.

(56) References Cited

U.S. PATENT DOCUMENTS

| | | | |
|---|---|---|---|
| 2018/0045893 A1* | 2/2018 | Huybrechts | G02B 6/3562 |
| 2023/0082934 A1* | 3/2023 | Hara | H04B 10/614 |

OTHER PUBLICATIONS

D. B. Mortimore, Wavelength-flattened fused couplers, Electronics Letters, vol. 21, No. 17, 1985.

* cited by examiner

OPTICAL COMMUNICATION SYSTEM AND OPTICAL COMMUNICATION METHOD

CROSS-REFERENCE TO RELATED APPLICATIONS

This application is a 371 U.S. National Phase of International Application No. PCT/JP2020/009558 filed on Mar. 6, 2020, which claims priority to Japanese Application No. 2019-052094 filed on Mar. 20, 2019. The entire disclosures of the above applications are incorporated herein by reference.

TECHNICAL FIELD

The present disclosure relates to an optical communication system and an optical communication method.

BACKGROUND ART

Thanks to explosive spread of the Internet, the number of subscribers to FTTH (Fiber to the home) that provides high-speed communication services is on the increase. Current FTTH services use 1G-EPON (gigabit-ethernet passive optical network) with a communication speed of 1 Gbit/s, but in the future, an even broader band will be demanded to cope with an increase in the number of subscribers due to further spread of the Internet, application to a backhaul connection of a 5th generation mobile communication system, the IoT (Internet of Things), 4K/8K high-resolution video distribution services, and the like. Currently, in view of such demands, active discussions are being held by standardization bodies such as IEEE and ITU in relation to already standardized 10G-EPON, 40 Gbit/s-class PON (ITU-T Rec G.989 series), and 100-Gbit/s-class next-generation PON system (IEEE802.3 ca).

Generally, in relation to FTTH services, to efficiently accommodate subscribers who are two-dimensionally spread and to economically accommodate a plurality of services, a star PON system that uses TDM (Time Division Multiplexing) in relation to a service and WDM (Wavelength Division Multiplexing) to multiplex services (service multiplexing) is introduced.

FIG. 1 shows a typical star PON system that uses two wavelengths based on WDM. In the drawing, "100" is a telecommunications carrier office, "101-1" is an OLT (Optical Line Terminal) for a service A ($\lambda$1) installed at an exchange office, "101-2" is an OLT for a service B ($\lambda$2) installed at the exchange office, "102" is a first-stage 2×m optical splitter (in FIG. 1, m=4), "103" is a main optical fiber subscriber line to an area 2, "104" is a second-stage 1×1 optical splitter to the area 2, "105" is one branch optical fiber subscriber line, and "106-1" to "106-1" are each one in-house device (ONU: Optical Network Unit) in the area 2 that is installed at a home of a subscriber, respectively. An economic FTTH including a plurality of services may be achieved by sharing devices and fibers among a plurality of users by a configuration of connecting a plurality of user devices (ONUs) to an in-office device (OLT), and by achieving efficient accommodation in another area by using the first-stage 2×m optical splitter 102.

CITATION LIST

Non-Patent Literature

Non-Patent Literature 1: 2018 IEICE Society Conference, Presentation No. B-8-23, September 2018

Non-Patent Literature 2: D. B. Mortimore, "Wavelength-flattened fused couplers," ELECTRONICS LETTERS, 15 Aug. 1985, Vol. 21, No. 17.

SUMMARY OF THE INVENTION

Technical Problem

It is true that, these days, a greater variety of services is provided thanks to the appearance of IoT in which all sorts of "things" are connected to the Internet to communicate with each other. FIG. 2 is a PON system that achieves service multiplexing by WDM, where the number of provided services is increased to N. Reference signs in the drawing are the same as those in FIG. 1. "101-1" to "101-$n$" are OLTs for services A to N (wavelengths $\lambda$1 to $\lambda$n), and an optical splitter 202 is an n×m optical splitter (in FIG. 2, n inputs, m outputs, m=4).

Up to now, it has been considered to provide N services to all the users accommodated by the telecommunications carrier office 100, but with application-oriented changes of the times caused by IoT, for example, rather than providing N services in all areas, a method of limiting and providing distinctive services on a per-area basis in the manner of
(area 1=service A, service B),
(area 2=service B, service N−1, service N),
for example, has come to be considered. In other words, it is a method of actively limiting services on a per-area basis. This method is effective in reducing cost of terminals because the number of parts of a terminal may be reduced by not mounting n PDs (Photo Diode) capable of receiving all the wavelengths in the ONU as an in-house device.

Furthermore, Non-Patent Literature 1 indicates that, in a case where users are unevenly distributed, a reachable transmission distance regarding a farthest user may be increased by adjusting a splitting structure or a splitting ratio of an optical splitter. With the system described above, in the case of adopting service multiplexing by WDM, it is conceivable to install an OLT/ONU having a different output and a different receiver sensitivity for each service (that is, an optical loss budget is different for each service). Accordingly, depending on a transmission distance, there may be an area where a service cannot be provided from the standpoint of the optical loss budget. The method of Non-Patent Literature 1 is a method of limiting services on a per-area basis from the standpoint of the optical loss budget, and of increasing the reachable transmission distance.

In the case of limiting services on a per-area basis in the manner described above, the configuration in FIG. 2 includes a problem that signal quality is reduced. This is due to the following reasons.

Generally, the optical splitter 202 used in an access network is desirably a device as described in Non-Patent Literature 2 that achieves a splitting ratio that is independent of wavelength input to the optical splitter when performing service multiplexing based on wavelength, from the standpoint of providing all services to all users. The optical splitter described in Non-Patent Literature 2 outputs all input wavelengths evenly at a certain splitting ratio, and is thus effective in a situation where all services are to be provided in all areas. In the case of applying such an optical splitter to an access network, when focusing on an area 1 where it suffices if the service A and the service B, or in other words, the wavelength $\lambda$1 and the wavelength $\lambda$2, are received, unnecessary wavelengths $\lambda$3 to $\lambda$n are also input to the ONU in the area 1. Light at these unnecessary wavelengths $\lambda$3 to λn causes linear crosstalk to service light that is to be provided (λ1 and λ2) and reduces the signal quality.

The easiest method for preventing degradation of signal quality due to linear crosstalk is to install, at an output end of the optical splitter 202, a WDM filter that transmits specific light and blocks other light. However, there are problems that installing WDM filters with different transmission characteristics at output ends of optical splitters increases the cost, and also greatly affects the size when modularizing the optical splitters.

Accordingly, in view of the problems mentioned above, the present invention aims to provide an optical communication system and an optical communication method that are capable of, when assigning wavelengths on a per-service basis and providing services on a per-area basis, preventing degradation of signal quality due to linear crosstalk and preventing an increase in cost and size.

Means for Solving the Problem

To achieve the above-described object, an optical communication system according to the present invention controls a fused extension length of a fiber optical splitter, and thereby selectively controls an output wavelength (service) for each output port by using wavelength dependence of an optical splitter and without using a WDM filter.

Specifically, an optical communication system according to the present invention is an optical communication system including: an optical splitter connecting N first ports and M second ports by a combination of 2×2 fiber optical splitters, N being an integer of two or more, M being an integer of two or more; optical transmitters for inputting optical signals of different wavelengths to respective first ports of the optical splitter; and optical receivers for receiving a single-wavelength optical signal or a multiplexed-wavelength optical signal that is output to respective second ports of the optical splitter, where wavelengths of optical signals to be received are limited for each group of the optical receivers, by using a correlation between a fused extension length of at least one of the 2×2 fiber optical splitters that is directly connected to the first port, among the 2×2 fiber optical splitters of the optical splitter, and wavelength output characteristics of the second port of the optical splitter.

Additionally, the optical communication system according to the present invention may input a multiplexed-wavelength optical signal to at least one of the first ports of the optical splitter.

Furthermore, an optical communication method according to the present invention is an optical communication method performed by an optical splitter connecting N first ports and M second ports by a combination of 2×2 fiber optical splitters, N being an integer of two or more, M being an integer of two or more, the method including outputting, to respective second ports, as a single-wavelength optical signal or a multiplexed-wavelength optical signal, optical signals of different wavelengths input to respective first ports or a multiplexed-wavelength optical signal input to at least one of the first ports, where wavelength output characteristics of the second port of the optical splitter are controlled based on a fused extension length of at least one of the 2×2 fiber optical splitters that is directly connected to the first port, among the 2×2 fiber optical splitters of the optical splitter, and wavelengths of optical signals to be received are limited for each group of the optical receivers connected to the second port of the optical splitter.

The optical splitter has a structure where a plurality of 2×2 fiber optical splitters are combined, and wavelengths to be output to the second port may be changed by adjusting the fused extension length of at least one 2×2 fiber optical splitter. Accordingly, whether to provide a service in an area or not may be controlled based on the wavelength characteristics of the optical splitter by installing the optical splitter in an optical communication system that assigns wavelengths on a per-service basis.

Accordingly, the present invention is capable of providing an optical communication system and an optical communication method that are capable of, when assigning wavelengths on a per-service basis and providing services on a per-area basis, preventing degradation of signal quality due to linear crosstalk and preventing an increase in cost and size.

In relation to the optical splitter, N may be four and M may be four, and the first ports and the second ports may be connected by a combination of three 2×2 fiber optical splitters, second and third ones of the first ports may be connected to respective input sides of a first one of the 2×2 fiber optical splitters, a first one of the first ports and one of output sides of the first one of the 2×2 fiber optical splitters may be connected to respective input sides of a second one of the 2×2 fiber optical splitters, a fourth one of the first ports and another one of the output sides of the first one of the 2×2 fiber optical splitters may be connected to respective input sides of a third one of the 2×2 fiber optical splitters, output sides of the second one of the 2×2 fiber optical splitters may be connected to first and second ones of the second ports, respectively, and output sides of the third one of the 2×2 fiber optical splitters may be connected to third and fourth ones of the second ports, respectively.

In relation to the optical splitter, N may be four and M may be four, and the first ports and the second ports may be connected by a combination of three 2×2 fiber optical splitters, first and second ones of the first ports may be connected to respective input sides of a first one of the 2×2 fiber optical splitters, a third one of the first ports and one of output sides of the first one of the 2×2 fiber optical splitters may be connected to respective input sides of a second one of the 2×2 fiber optical splitters, a fourth one of the first ports and one of output sides of the second one of the 2×2 fiber optical splitters may be connected to respective input sides of a third one of the 2×2 fiber optical splitters, another one of the output sides of the first one of the 2×2 fiber optical splitters may be connected to a first one of the second ports, another one of the output sides of the second one of the 2×2 fiber optical splitters may be connected to a second one of the second ports, and output sides of the third one of the 2×2 fiber optical splitters may be connected to third and fourth ones of the second ports, respectively.

Additionally, the inventions described above may be combined in any possible way.

Effects of the Invention

The present invention is capable of providing an optical communication system and an optical communication method that are capable of, when assigning wavelengths on a per-service basis and providing services on a per-area basis, preventing degradation of signal quality due to linear crosstalk and preventing an increase in cost and size.

DESCRIPTION OF EMBODIMENTS

Embodiments of the present invention will be described with reference to the appended drawings. Embodiments described below are exemplary modes of the present invention, and the present invention is not limited to the following embodiments. Additionally, structural elements in the present specification and drawings with same reference signs indicate same structural elements.

(Wavelength Characteristics of Optical Splitter)

There are two types of optical splitters. One is a fiber optical splitter where a plurality of optical fiber cores are fused and extended to reduce light-trapping effect of the cores such that light is coupled between adjacent fibers. The other is a waveguide optical splitter where an optical circuit is formed on fused quartz or silicon substrate by using a semiconductor process technology such as photolithography.

Output characteristics of a fiber optical splitter are known to have wavelength dependence as indicated by the following expressions.

[Math. 1]

$$P_{out\_1} = P_{in_1} \cos^2(CL) \quad (1)$$

$$P_{out\_2} = P_{in1} \sin^2(CL) \quad (2)$$

$$C = \frac{3\pi\lambda}{32n_0 d^2} \frac{1}{1 + (1/\upsilon)^2} \quad (3)$$

$$\upsilon = d\frac{2\pi}{\lambda}(n_0^2 - n_s^2) \quad (4)$$

Here, L is a fused extension length (μm), λ is an input wavelength to the optical splitter, d is a core diameter at the time of fusing and extending, $n_0$ is a fiber core refractive index, and ns is a cladding refractive index.

Expressions (1) and (2) are indicated by functions, wavelength λ and fused extension length L, and indicate that when a wavelength that is to be input to the fiber optical splitter is determined, transmission characteristics for an output wavelength may be controlled by controlling the length of fusing and extending.

For its part, the optical splitter described in Non-Patent Literature 2 has a structure where a fused and extended structure of two optical fibers having different propagation constants is tapered to achieve wavelength independence, and where all input wavelengths are equally output at a specific splitting ratio. Accordingly, this optical splitter is effective in relation to an optical communication system for providing all services in all areas, but a WDM filter is required from the standpoint of signal quality in the case of an optical communication system that limits services on a per-area basis.

In the following embodiments, optical communication systems that selectively control an output wavelength on a per-output-port basis by actively using wavelength dependence of an optical splitter instead of using a WDM filter will be described.

Embodiment 1

Figure 5:
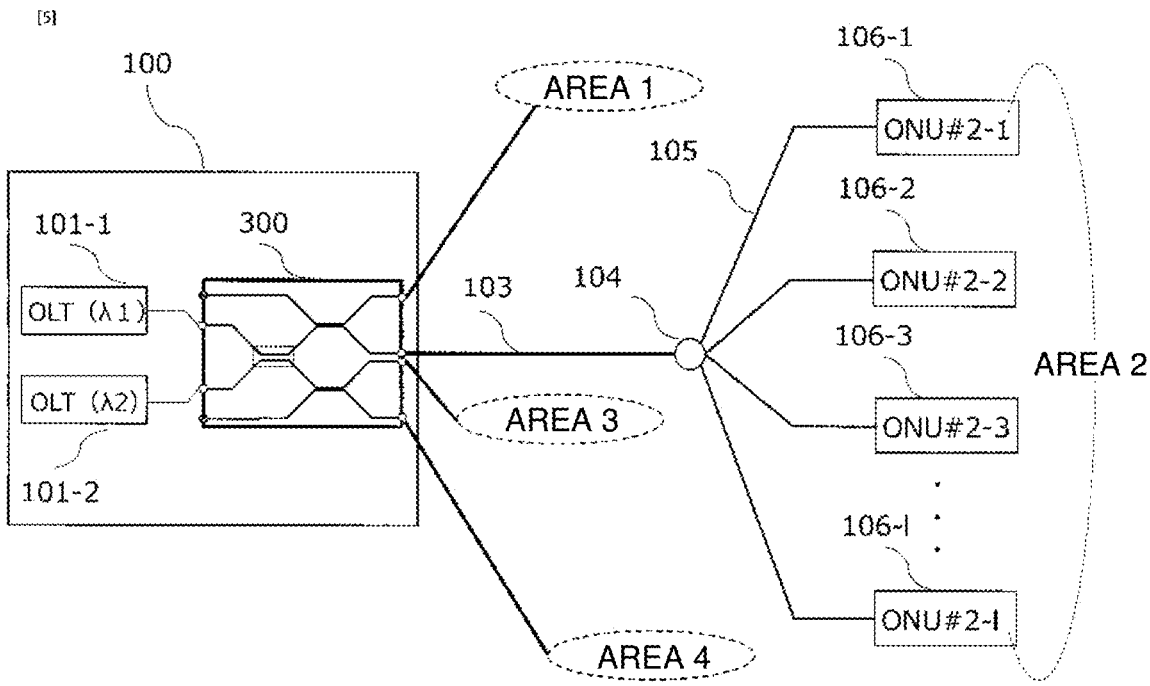
FIG. 5 is a diagram for describing an optical communication system according to the present invention.

FIG. 5 is a diagram for describing an optical communication system of the present embodiment. The optical communication system according to Embodiment 1 is an optical communication system including an optical splitter 300, optical transmitters 101, and optical receivers 106. Here, the optical splitter 300 is an optical splitter connecting N first ports and M second ports by a combination of 2×2 fiber optical splitters, N being an integer of two or more, M being an integer of two or more. The optical transmitters 101 input optical signals of different wavelengths to respective first ports of the optical splitter 300. The optical receivers 106 receive a single-wavelength optical signal or a multiplexed-wavelength optical signal that is output to respective second ports of the optical splitter 300. With the configuration described above, the optical communication system limits wavelengths of optical signals to be received for each group of the optical receivers 106, by using a correlation between a fused extension length of at least one of the 2×2 fiber optical splitters that is directly connected to the first port, among the 2×2 fiber optical splitters of the optical splitter 300, and wavelength output characteristics of the second port of the optical splitter 300.

Figure 1:
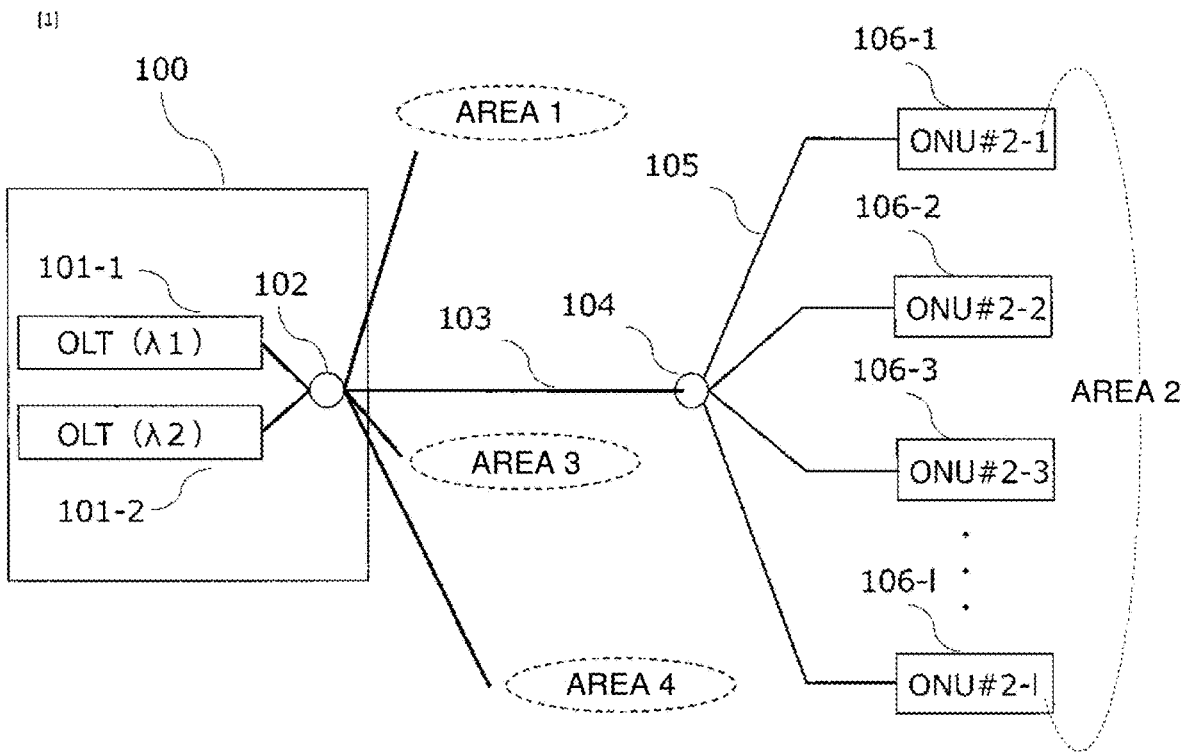
FIG. 1 is a diagram for describing a star PON system.
Figure 2:
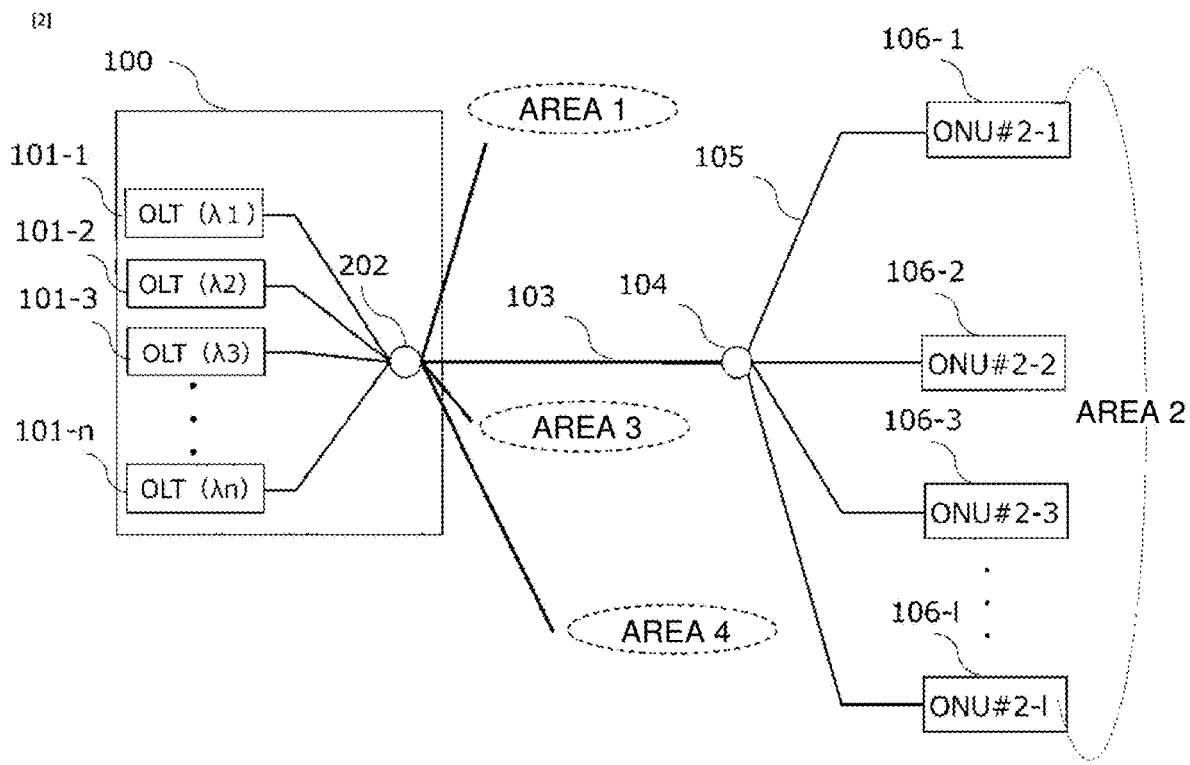
FIG. 2 is a diagram for describing a star WDM PON system where the number of services is n.
Figure 3:
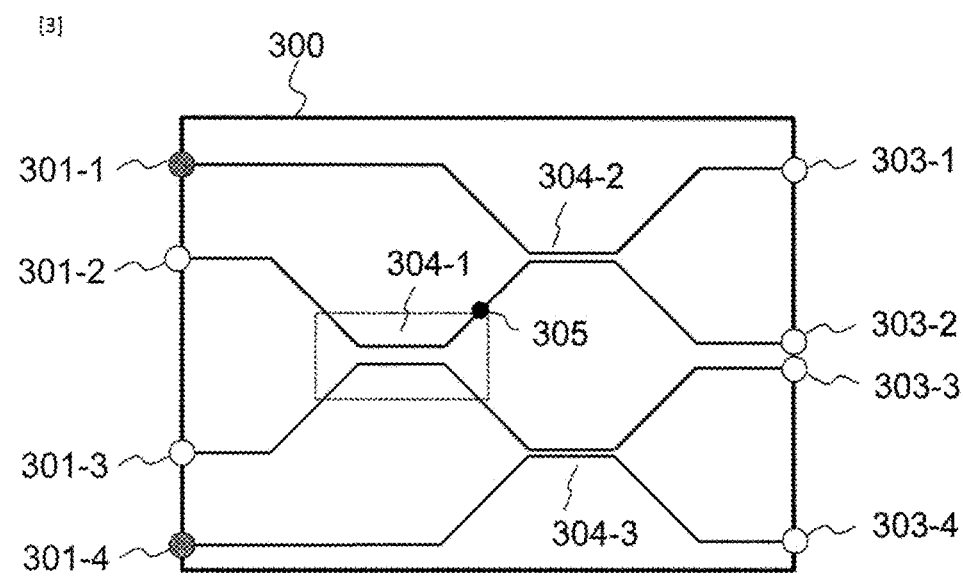
FIG. 3 is a diagram for describing an optical splitter provided in an optical communication system according to the present invention.

FIG. 3 is a diagram for describing a structure of the optical splitter 300. In relation to the optical splitter 300:

N is four and M is four, and the first ports 301 and the second ports 303 are connected by a combination of three 2×2 fiber optical splitters 304, second and third first ports (301-2, 302-3) are connected to respective input sides of a first 2×2 fiber optical splitter 304-1, a first first port 301-1 and one of output sides of the 2×2 fiber optical splitter 304-1 are connected to respective input sides of a second 2×2 fiber optical splitter 304-2, a fourth first port 301-4 and the other one of the output sides of the 2×2 fiber optical splitter 304-1 are connected to respective input sides of a third 2×2 fiber optical splitter 304-3, output sides of the 2×2 fiber optical splitter 304-2 are connected to first and second second ports (303-1, 303-2), respectively, and output sides of the 2×2 fiber optical splitter 304-3 are connected to third and fourth second ports (303-3, 303-4), respectively.

The 2×2 fiber optical splitters 304 each have a fused extension part. "305" is a position on the one of the output sides of the 2×2 fiber optical splitter 304-1. To simplify description, two types of services are assumed, namely, a service A (wavelength λ1) and a service B (wavelength λ2). The wavelength λ1 is input to the first port 301-2, and the wavelength λ2 is input to the first port 301-3. Additionally, the first ports (301-1, 301-4) are blocked.

Figure 4:
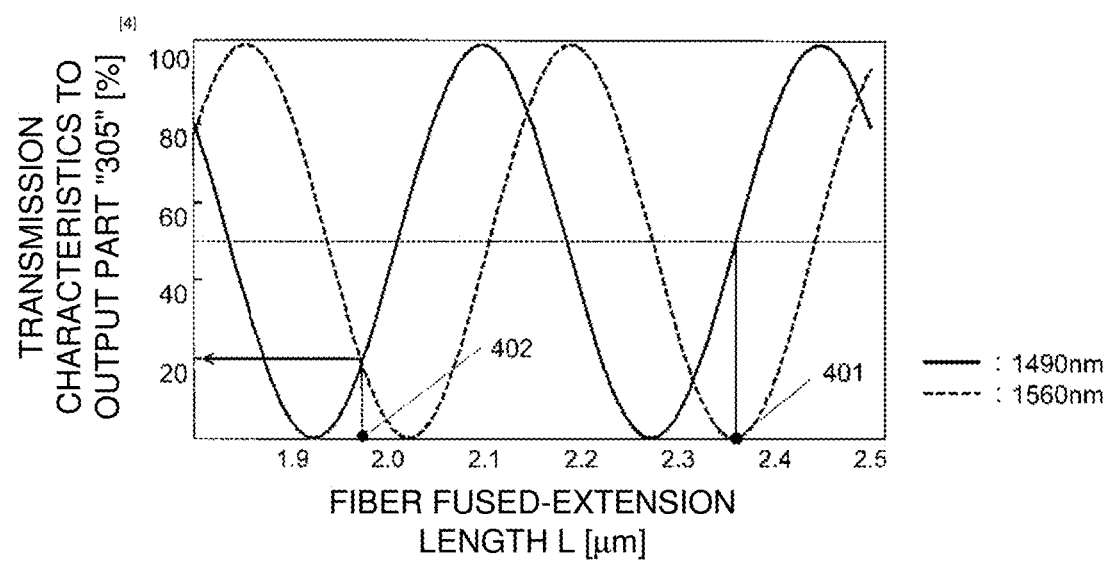
FIG. 4 is a diagram for describing wavelength characteristics of an optical splitter provided in an optical communication system according to the present invention.

FIG. 4 is a diagram for describing transmission characteristics to the output part 305 relative to a fused extension length of the 2×2 fiber optical splitter 304-1, where light of λ1=1490 nm is input from the first port 301-2 of the optical splitter 300 and light of λ2=1560 nm is input from the first port 301-3. FIG. 4 indicates that, in relation to a fiber optical splitter, transmission characteristics for an output wavelength may be controlled by controlling a length of fusing and extending.

For example, at "305", in the case of the fused extension length at "401" in FIG. 4, light at ½ (50%) of input light intensity is output in relation to wavelength λ1=1490 nm, and light at 1/50 (2%) of input light intensity is output in relation to wavelength λ2=1560 nm. In the case where an output ratio at the fused extension parts of the 2×2 fiber optical splitters (304-2, 304-3) is a 50% splitting ratio that is wavelength independent, the output ratios at the second ports (303-1 to 303-4) for the wavelengths are as follows.

TABLE 1

| Second Port | Wavelength λ1 (1490 nm) | Wavelength λ2 (1560 nm) |
|---|---|---|
| 303-1 | 25% | 1% |
| 303-2 | 25% | 1% |
| 303-3 | 25% | 49% |
| 303-4 | 25% | 49% |

In this manner, light intensity of an output wavelength may be controlled by controlling the fused extension length of a first-stage fused extension part (2×2 fiber optical splitter 304-1) on the first port side and providing wavelength dependence. FIG. 5 shows an example where the optical splitter 300 in FIG. 3 is applied to a star PON system. With a connection structure in FIG. 5, light at the wavelength λ2 may be blocked in relation to an area 1 and an area 2, without installing a WDM filter for blocking light at the wavelength λ2 at an output end of the optical splitter 300.

The description given above relates to an example of the present embodiment, and describes a configuration for blocking a specific wavelength in relation to a specific second port. For example, based on the transmission characteristics in FIG. 4, when the fused extension length of the 2×2 fiber optical splitter 304-1 is at "402", the transmission characteristics to the output part "305" becomes 20% relative to the input light intensity for both λ1 and λ2. In the case where an output ratio at the fused extension parts of the 2×2 fiber optical splitters (304-2, 304-3) is a 50% splitting ratio that is wavelength independent, the output ratios at the second ports (303-1 to 303-4) for the wavelengths are as follows. The optical splitter 300 having such wavelength characteristics is desirably applied to a star PON system where a transmission distance is different depending on the area.

TABLE 2

| Second Port | Wavelength λ1 (1490 nm) | Wavelength λ2 (1560 nm) |
|---|---|---|
| 303-1 | 10% | 10% |
| 303-2 | 10% | 10% |

TABLE 2-continued

| Second Port | Wavelength λ1 (1490 nm) | Wavelength λ2 (1560 nm) |
|---|---|---|
| 303-3 | 40% | 40% |
| 303-4 | 40% | 40% |

As described above, in the present embodiment, in relation to a star PON system that achieves service multiplexing by WDM, a signal output from a specific port of an optical splitter may be selectively controlled in a situation where services are limited on a per-area basis. Here, such control is performed by controlling the fused extension length of a fiber optical splitter and changing the wavelength dependence of the optical splitter.

Embodiment 2

Figure 6:
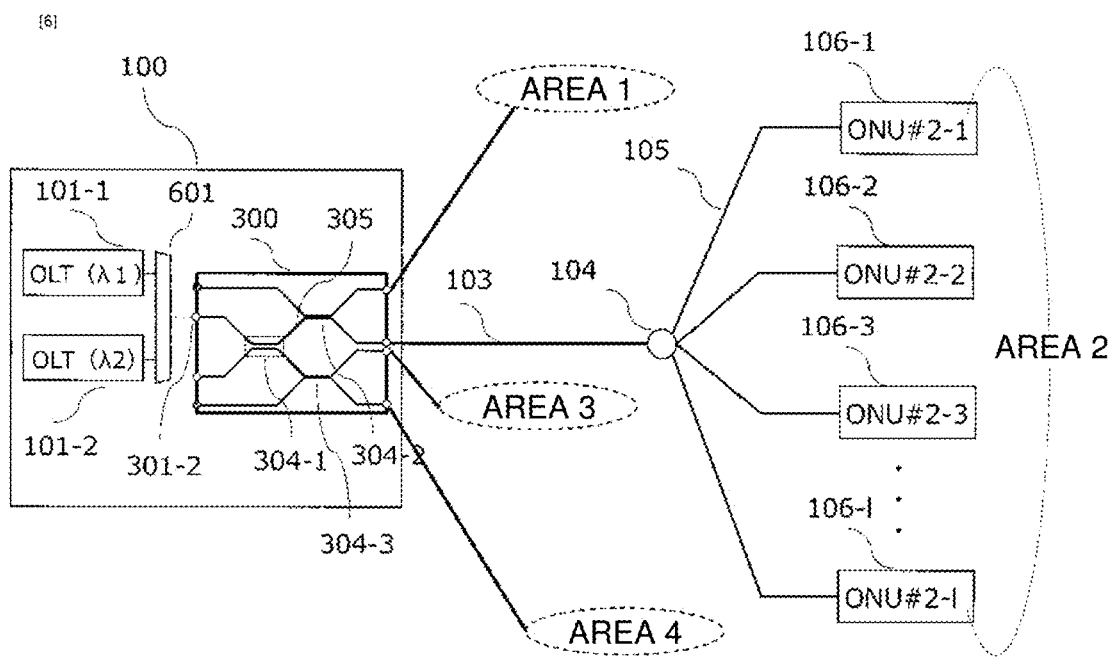
FIG. 6 is a diagram for describing an optical communication system according to the present invention.

FIG. 6 is a diagram for describing an optical communication system of the present embodiment. The optical communication system according to Embodiment 2 is an optical communication system including the optical splitter 300, the optical transmitters 101, and the optical receivers 106. Here, the optical splitter 300 is an optical splitter connecting N first ports and M second ports by a combination of 2×2 fiber optical splitters, N being an integer of two or more, M being an integer of two or more. The optical transmitters 101 input a multiplexed-wavelength optical signal to at least one of the first ports of the optical splitter 300. The optical receivers 106 receive a single-wavelength optical signal or a multiplexed-wavelength optical signal that is output to respective second ports of the optical splitter 300. With the configuration described above, the optical communication system limits wavelengths of optical signals to be received for each group of the optical receivers 106, by using a correlation between a fused extension length of at least one of the 2×2 fiber optical splitters that is directly connected to the first port, among the 2×2 fiber optical splitters of the optical splitter 300, and wavelength output characteristics of the second port of the optical splitter 300.

The optical communication system of the present embodiment is different from the optical communication system of Embodiment 1 in that a wavelength multiplexer 601 is provided at output ends of the optical transmitter 101-1 of the telecommunications carrier office 100 for the wavelength λ1 and the optical transmitter 101-2 for the wavelength λ2, and WDM signals at λ1 and λ2 are input to a first port 301-2 of the optical splitter 300. For example, array waveguide gratings (AWG) may be cited as the wavelength multiplexer 601.

Figure 7:
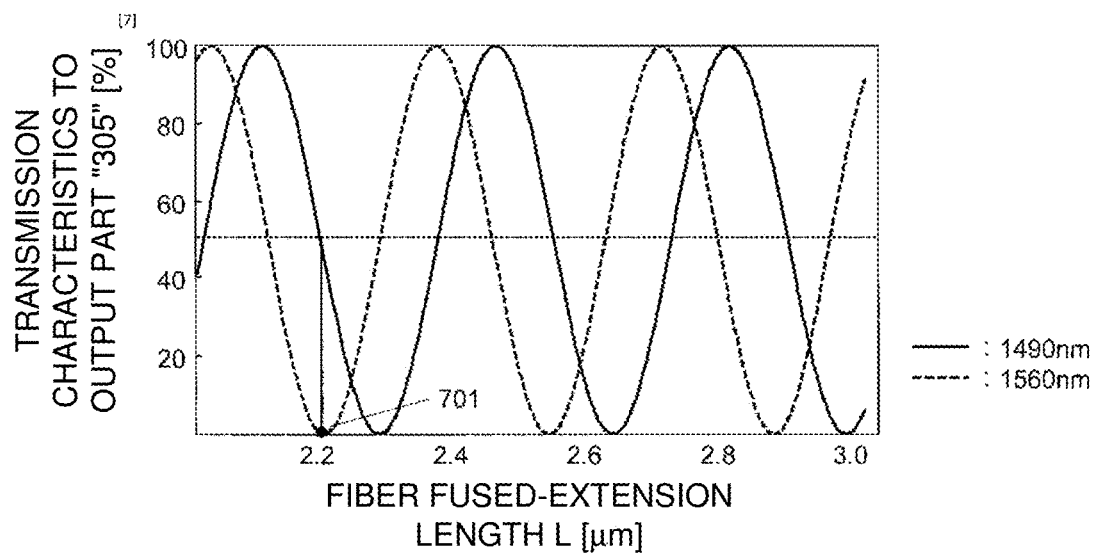
FIG. 7 is a diagram for describing wavelength characteristics of an optical splitter provided in an optical communication system according to the present invention.

FIG. 7 is a diagram for describing transmission characteristics to the output part 305 relative to the fused extension length of the 2×2 fiber optical splitter 304-1, where light of λ1=1490 nm and light of λ2=1560 nm is input from the first port 301-2 of the optical splitter 300. FIG. 7 also indicates that, in relation to a fiber optical splitter, transmission characteristics for an output wavelength may be controlled by controlling a length of fusing and extending.

For example, at "305", in the case of the fused extension length at "701" in FIG. 7, light at ½ (50%) of input light intensity is output in relation to wavelength λ1=1490 nm, and light at 1/50 (2%) of input light intensity is output in relation to wavelength λ2=1560 nm. In the case where an output ratio at the fused extension parts of the 2×2 fiber optical splitters (304-2, 304-3) is a 50% splitting ratio that is wavelength independent, the output ratios at the second ports (303-1 to 303-4) for the wavelengths are as follows.

TABLE 3

| Second Port | Wavelength λ1 (1490 nm) | Wavelength λ2 (1560 nm) |
|---|---|---|
| 303-1 | 25% | 1% |
| 303-2 | 25% | 1% |
| 303-3 | 25% | 49% |
| 303-4 | 25% | 49% |

In this manner, also in a case where wavelength-multiplexed light (λ1+λ2) is input from a same port, light intensity of an output wavelength may be controlled in the same manner as in Embodiment 1, by controlling the fused extension length of a first-stage fused extension part (2×2 fiber optical splitter 304-1) on the first port side and providing wavelength dependence.

As described above, in the present embodiment, in relation to a star PON system that achieves service multiplexing by WDM, a signal output from a specific port of an optical splitter may be selectively controlled in a situation where services are limited on a per-area basis. Here, such control is performed by controlling the fused extension length of a fiber optical splitter and changing the wavelength dependence of the optical splitter.

Embodiment 3

Figure 8:
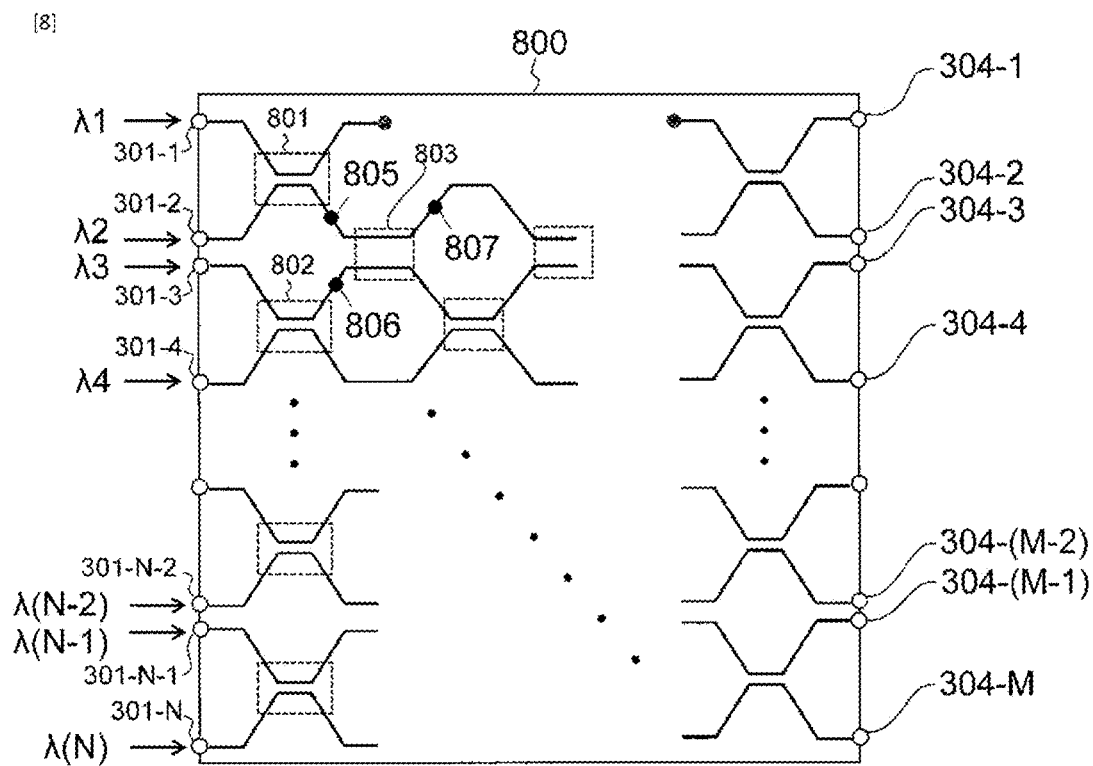
FIG. 8 is a diagram for describing an optical splitter provided in an optical communication system according to the present invention.

FIG. 8 is a diagram for describing a structure of an optical splitter 800 provided in an optical communication system of the present embodiment. The optical splitter 800 is different from the optical splitters 300 described in Embodiments 1 and 2 in that the optical splitter 300 is generalized to an N×M fiber optical splitter 800 having N inputs and M outputs (where N and M are integers of two or more).

Optical signals of wavelengths (λ1 to λN) are input to first ports (301-1 to 301-N), for example. Additionally, a multiplexed-wavelength optical signal may be input to a specific first port, as described in Embodiment 2. A 2×2 fiber optical splitter 801 mixes or separates the wavelengths λ1 and λ2 input from the first ports 301-1 and 301-2 according to wavelength characteristics based on the fused extension length. A 2×2 fiber optical splitter 802 mixes or separates the wavelengths λ3 and λ4 input from the first ports 301-3 and 301-4 according to wavelength characteristics based on the fused extension length. A 2×2 fiber optical splitter 803 mixes or separates an output (805) of the 2×2 fiber optical splitter 801 and an output (806) of the 2×2 fiber optical splitter 802 according to wavelength characteristics based on the fused extension length. Optical signals that passed through a combination of a plurality of 2×2 fiber optical splitters are output to the second ports (304-1 to 304-M).

Operation of the optical splitter 800 will be described.

First, the 2×2 fiber optical splitter 801 is a merging part for the wavelengths λ1 and λ2, and thus, transmission characteristics for the wavelengths λ1 and λ2 to an output part "805" may be controlled based on the fused extension length of the 2×2 fiber optical splitter 801 in the manner described in Embodiment 1. In the same manner, the 2×2 fiber optical splitter 802 is a merging part for the wavelengths λ3 and λ4, and thus, transmission characteristics for the wavelengths λ3 and λ4 to an output part "806" may be controlled based on the fused extension length of the 2×2 fiber optical splitter 802 in the manner described above. Moreover, in relation to the 2×2 fiber optical splitter 803, in a case where the 2×2 fiber optical splitters (801, 802) perform splitting at an output ratio of 50% for each wavelength, for example, light of λ1+λ2 is input to the input part "805" of the 2×2 fiber optical splitter 803, and light of λ3+λ4 is input to the input part "806" of the 2×2 fiber optical splitter 803. Accordingly, as described in Embodiment 2, transmission characteristics for the wavelengths λ1, λ2, λ3, λ4 to an output part "807" may be controlled based on the fused extension length of the 2×2 fiber optical splitter 803.

The optical splitter 800 including a combination of 2×2 fiber optical splitters is capable of controlling the fused extension length of one of the 2×2 fiber optical splitters and changing the wavelength dependence of the optical splitter, and of selectively controlling a signal output from a specific port of the optical splitter. Accordingly, when the optical splitter 800 is applied to the star PON system in FIG. 5 or 6 instead of the optical splitter 300, N services in M areas may be limited on a per-area basis without using the WDM filter and by controlling an output wavelength for each second port.

Embodiment 4

Figure 9:
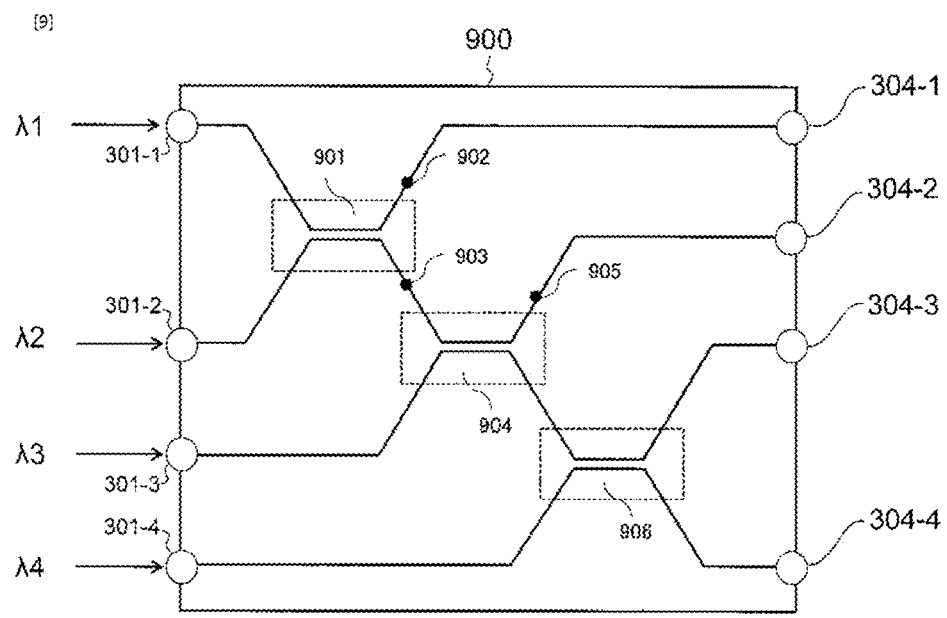
FIG. 9 is a diagram for describing an optical splitter provided in an optical communication system according to the present invention.

FIG. 9 is a diagram for describing a structure of an optical splitter 900 provided in an optical communication system of the present embodiment. The optical splitter 900 is different from the optical splitters in Embodiments 1 to 3 in that a splitting structure of the splitter is changed from a symmetrical structure to an asymmetrical structure. In relation to the optical splitter 900, N is four and M is four, and the first ports and the second ports are connected by a combination of three 2×2 fiber optical splitters. The optical splitter 900 is configured in the following manner.

First and second first ports (301-1, 301-2) are connected to respective input sides of a 2×2 fiber optical splitter 901.

A third first port 301-3 and one of output sides of the 2×2 fiber optical splitter 901 are connected to respective input sides of a 2×2 fiber optical splitter 904.

A fourth first port 301-4 and one of output sides of the 2×2 fiber optical splitter 904 are connected to respective input sides of a 2×2 fiber optical splitter 906.

The other one of the output sides of the 2×2 fiber optical splitter 901 is connected to a first second port 304-1.

The other one of the output sides of the 2×2 fiber optical splitter 904 is connected to a second second port 304-2.

Output sides of the 2×2 fiber optical splitter 906 are connected to third and fourth second ports (304-3, 304-4), respectively.

In a case where a distribution of accommodated users is uneven, such an unbalanced optical splitter 900 may achieve an increase in length for a specific port (the second port 304-1 in FIG. 9) by controlling the splitting structure or the splitting ratio of the fused extension part of each 2×2 fiber optical splitter.

A case where light of λ1 is input from the first port 301-1, light of λ2 is input from the first port 301-2, light of λ3 is input from the first port 301-3, and light of λ4 is input from the first port 301-4 will be described as an example. With the configuration of the unbalanced optical splitter in FIG. 9, each second port is limited to the following wavelengths due to back reflection at a split part that is a return loss of the optical splitter.

Second port 304-1: λ1, λ2
Second port 304-2: λ1, λ2, λ3
Second port 304-3: λ1, λ2, λ3, λ4
Second port 304-4: λ1, λ2, λ3, λ4

Furthermore, when λ1 is 1490 nm and λ2 is 1560 nm, transmission characteristics to the second port 304-1 are as shown in FIG. 4. In the case of the fused extension length at "401" in FIG. 4, 50% of λ1 and 2% of λ2 are output from the second port 304-1 in relation to light intensity of input light. At an output part "903", output is performed by characteristics inverse to those of the second port 304-1 (i.e., $\lambda 1=50\%$, $\lambda 2=98\%$).

Figure 10:
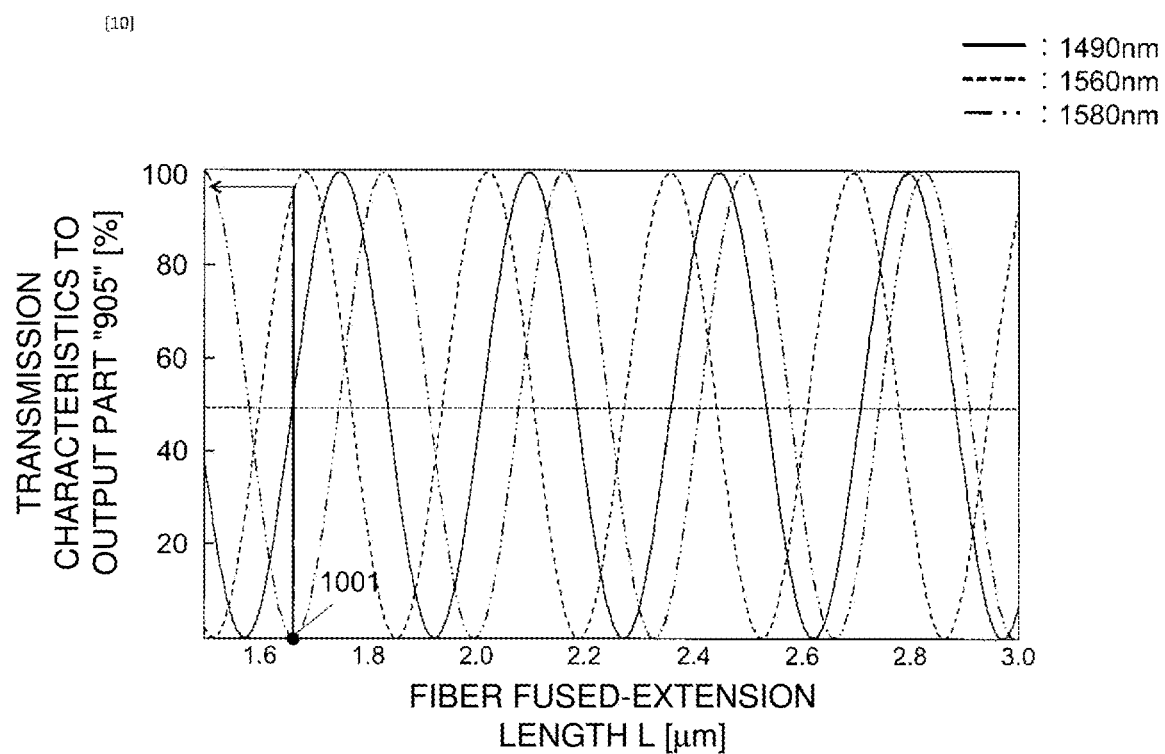
FIG. 10 is a diagram for describing wavelength characteristics of an optical splitter provided in an optical communication system according to the present invention.

FIG. 10 shows transmission characteristics to an output part "905" relative to the fused extension length of the 2×2 fiber optical splitter 904, where light of $\lambda 1=1490$ nm and $\lambda 2=1560$ nm is input from the point "903" of the optical splitter 900 and light of $\lambda 3=1580$ nm is input from the first port 301-3.

For example, at the point "905", in the case of the fused extension length at "1001" in FIG. 10, light at ½ (50%) of input light intensity is output in relation to wavelength $\lambda 1=1490$ nm, light at ¹⁹⁄₂₀ (95%) of input light intensity is output in relation to wavelength $\lambda 2=1560$ nm, and light at ³⁄₅₀ (6%) of input light intensity is output in relation to wavelength $\lambda 3=1580$ nm.

In the case where an output ratio of the 2×2 fiber optical splitter 906 is a 50% splitting ratio that is wavelength independent, the output ratios at the second ports B to D for the wavelengths are as follows.

TABLE 4

| Second Port | Wavelength $\lambda 1$ | Wavelength $\lambda 2$ | Wavelength $\lambda 3$ | Wavelength $\lambda 4$ |
|---|---|---|---|---|
| 303-2 | 25% | 95% | 6% | — |
| 303-3 | 12.5% | 2.5% | 47% | 50% |
| 303-4 | 12.5% | 2.5% | 47% | 50% |

Figure 11:
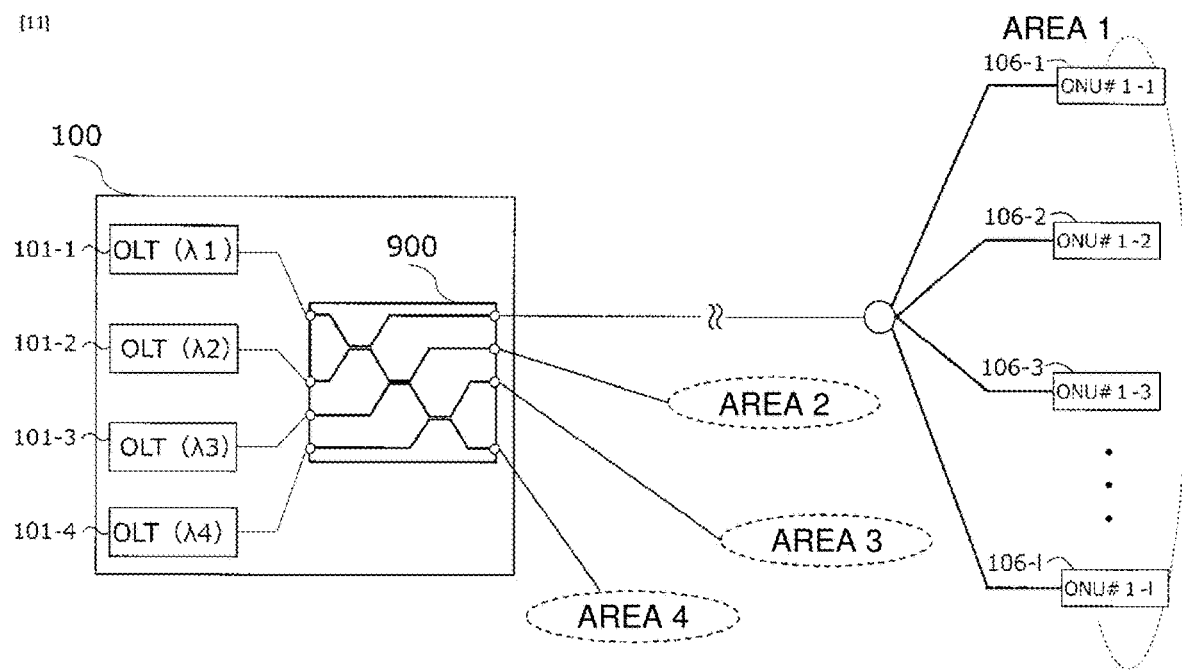
FIG. 11 is a diagram for describing an optical communication system according to the present invention.

FIG. 11 is a diagram for describing the optical communication system where the optical splitter 900 is applied to a star PON system. Service providing areas corresponding to the second ports (304-1 to 304-4) are given as areas 1, 2, 3, 4, respectively, and it is assumed that services are multiplexed on a per-wavelength basis in the manner of $\lambda 1$=service A, $\lambda 2$=service B, $\lambda 3$=service C, and $\lambda 4$=service D. The optical communication system in FIG. 11 is capable of selectively providing services on a per-area basis in the manner of:

Area 1: only service A,
Area 2: service A, service B,
Areas 3, 4: service A, service C, service D.

As described above, in the case of limiting services on a per-area basis by a star PON system that achieves service multiplexing by WDM, the wavelength dependence of the optical splitter may be changed by controlling the fused extension length of an unbalanced fiber optical splitter, and a signal output from a specific port of an optical splitter may be selectively controlled. Additionally, the present embodiment describes a case where the unbalanced 4×4 optical splitter 900 is used, but a same effect may be obtained by an N×M unbalanced optical splitter including a combination of 2×2 fiber optical splitters.

Other Embodiments

In the embodiments described above, a network topology in an optical access section is described to be a star topology for the sake of convenience, but the present invention is not limited to such an example. For example, a hybrid structure of a ring topology, a bus topology and the topology described above may also adopt the N×M optical splitter including a combination of 2×2 fiber optical splitters, and may achieve the same effects as those described in Embodiments 1 to 4.

Effects of the Invention

The present invention is an optical communication method performed by an optical splitter connecting N first ports and M second ports by a combination of 2×2 fiber optical splitters, N being an integer of two or more, M being an integer of two or more, the method including outputting, to respective second ports, as a single-wavelength optical signal or a multiplexed-wavelength optical signal, optical signals of different wavelengths input to respective first ports or a multiplexed-wavelength optical signal input to at least one of the first ports.

The present invention is an optical communication method where wavelength output characteristics of the second port of the optical splitter are controlled based on a fused extension length of at least one of the 2×2 fiber optical splitters that is directly connected to the first port, among the 2×2 fiber optical splitters of the optical splitter, and wavelengths of optical signals to be received are limited for each group of the optical receivers connected to the second port of the optical splitter.

According to the present invention, in a case of limiting services on a per-area basis, by selectively controlling a signal output from a specific port of the optical splitter without using a WDM filter, an increase in the cost and the module size may be prevented. The present invention uses the wavelength dependence of the optical splitter by controlling the fused extension length of the fiber optical splitter. Furthermore, in relation to a bandwidth-intensive WDM-PON that uses a plurality of wavelengths, a WDM filter for blocking a specific wavelength does not have to be provided on the ONU side, and wavelength independence (colorlessness) of the ONU may be economically achieved.

REFERENCE SIGNS LIST 100 telecommunications carrier office
101, 101-1, . . . , 101-n optical transmitter (OLT)
102 optical splitter
103 main optical fiber subscriber line
104 optical splitter
105 branch optical fiber subscriber line
106, 106-1, . . . , 106-1 optical receiver (ONU)
202 optical splitter
300 optical splitter
301, 301-1, . . . , 301-N first port
303, 303-1, . . . , 303-M second port
304, 304-1, 304-2, 304-3 2×2 fiber optical splitter
601 wavelength multiplexer
800 optical splitter
801 to 803 2×2 fiber optical splitter
900 optical splitter
901 to 903 2×2 fiber optical splitter

The invention claimed is:

1. An optical communication system comprising:
an optical splitter connecting N first ports and M second ports by a combination of 2×2 fiber optical splitters, N being an integer of two or more, M being an integer of two or more;
optical transmitters for either:
inputting optical signals of different wavelengths to respective ones of the first ports of the optical splitter; or
inputting a multiplexed-wavelength optical signal to at least one of the first ports of the optical splitter; and
optical receivers for receiving a single-wavelength optical signal of the optical signals of different wavelengths or the multiplexed-wavelength optical signal that is output to respective ones of the second ports of the optical splitter, wherein wavelengths of the optical signals to be received are limited for each group of the optical receivers, by using a correlation between a fused extension length of at least one of the 2×2 fiber optical splitters that is directly connected to the first ports, among the 2×2 fiber optical splitters of the optical splitter, and wavelength output characteristics of the second ports of the optical splitter, wherein, in relation to the optical splitter, N is four and M is four, and the first ports and the second ports are connected by a combination of three of the 2×2 fiber optical splitters, second and third ones of the first ports are connected to respective input sides of a first one of the 2×2 fiber optical splitters, a first one of the first ports and one of output sides of the first one of the 2×2 fiber optical splitters are connected to respective input sides of a second one of the 2×2 fiber optical splitters, a fourth one of the first ports and another one of the output sides of the first one of the 2×2 fiber optical splitters are connected to respective input sides of a third one of the 2×2 fiber optical splitters, output sides of the second one of the 2×2 fiber optical splitters are connected to first and second ones of the second ports, respectively, and output sides of the third one of the 2×2 fiber optical splitters are connected to third and fourth ones of the second ports, respectively.

2. The optical communication system according to claim 1, wherein a first transmitter of the optical transmitters is configured to input a first optical signal having a first wavelength of the optical signals of different wavelengths to one of the first ports, a second transmitter of the optical transmitters is configured to input a second optical signal having a second wavelength of the optical signals of different wavelengths to another of the first ports, a plurality of first receivers of the optical receivers are configured to receive the first optical signal via one of the second ports, and a plurality of second receivers of the optical receivers are configured to receive the second optical signal via another of the second ports.

3. The optical communication system according to claim 1, wherein the multiplexed-wavelength optical signal has a first multiplexed-wavelength signal and a second multiplexed-wavelength signal, first and second transmitters of the optical transmitters are configured to input the first multiplexed-wavelength signal to one of the first ports, third and fourth transmitters of the optical transmitters are configured to input the second multiplexed-wavelength signal to another of the first ports, a plurality of first receivers of the optical receivers are configured to receive the first multiplexed-wavelength signal via one of the second ports, and a plurality of second receivers of the optical receivers are configured to receive the second multiplexed-wavelength signal via another of the second ports.

4. An optical communication system comprising:

an optical splitter connecting N first ports and M second ports by a combination of 2×2 fiber optical splitters, N being an integer of two or more, M being an integer of two or more;

optical transmitters for either:
inputting optical signals of different wavelengths to respective ones of the first port of the optical splitter; or
inputting a multiplexed-wavelength optical signal to at least one of the first ports of the optical splitter; and optical receivers for receiving a single-wavelength optical signal of the optical signals of different wavelengths or the multiplexed-wavelength optical signal that is output to respective ones of the second ports of the optical splitter, wherein wavelengths of the optical signals to be received are limited for each group of the optical receivers, by using a correlation between a fused extension length of at least one of the 2×2 fiber optical splitters that is directly connected to the first ports, among the 2×2 fiber optical splitters of the optical splitter, and wavelength output characteristics of the second ports of the optical splitter, wherein, in relation to the optical splitter, N is four and M is four, and the first ports and the second ports are connected by a combination of three of the 2×2 fiber optical splitters, first and second ones of the first ports are connected to respective input sides of a first one of the 2×2 fiber optical splitters, a third one of the first ports and one of output sides of the first one of the 2×2 fiber optical splitters are connected to respective input sides of a second one of the 2×2 fiber optical splitters, a fourth one of the first ports and one of output sides of the second one of the 2×2 fiber optical splitters are connected to respective input sides of a third one of the 2×2 fiber optical splitters, another one of the output sides of the first one of the 2×2 fiber optical splitters is connected to a first one of the second ports, another one of the output sides of the second one of the 2×2 fiber optical splitters is connected to a second one of the second ports, and output sides of the third one of the 2×2 fiber optical splitters are connected to third and fourth ones of the second ports, respectively.

5. The optical communication system according to claim 4, wherein a first transmitter of the optical transmitters is configured to input a first optical signal having a first wavelength of the optical signals of different wavelengths to one of the first ports, a second transmitter of the optical transmitters is configured to input a second optical signal having a second wavelength of the optical signals of different wavelengths to another of the first ports, a plurality of first receivers of the optical receivers are configured to receive the first optical signal via one of the second ports, and a plurality of second receivers of the optical receivers are configured to receive the second optical signal via another of the second ports.

6. The optical communication system according to claim 4, wherein the multiplexed-wavelength optical signal has a first multiplexed-wavelength signal and a second multiplexed-wavelength signal, first and second transmitters of the optical transmitters are configured to input the first multiplexed-wavelength signal to one of the first ports, third and fourth transmitters of the optical transmitters are configured to input the second multiplexed-wavelength signal to another of the first ports, a plurality of first receivers of the optical receivers are configured to receive the first multiplexed-wavelength signal via one of the second ports, and a plurality of second receivers of the optical receivers are configured to receive the second multiplexed-wavelength signal via another of the second ports.

7. An optical communication method performed by an optical splitter connecting N first ports and M second ports by a combination of 2×2 fiber optical splitters, N being an integer of two or more, M being an integer of two or more, the method comprising outputting, to respective ones of the second ports, as a single wavelength optical signal of optical signals of different wavelengths or a multiplexed-wavelength optical signal, the optical signals of different wavelengths input to respective ones of the first ports or the multiplexed-wavelength optical signal input to at least one of the first ports, wherein wavelength output characteristics of the second ports of the optical splitter are controlled based on a fused extension length of at least one of the 2×2 fiber optical splitters that is directly connected to the first ports, among the 2×2 fiber optical splitters of the optical splitter, and wavelengths of the optical signals to be received are limited for each group of optical receivers connected to the second ports of the optical splitter, wherein, in relation to the optical splitter, N is four and M is four, and the first ports and the second ports are connected by a combination of three of the 2×2 fiber optical splitters, second and third ones of the first ports are connected to respective input sides of a first one of the 2×2 fiber optical splitters, a first one of the first ports and one of output sides of the first one of the 2×2 fiber optical splitters are connected to respective input sides of a second one of the 2×2 fiber optical splitters, a fourth one of the first ports and another one of the output sides of the first one of the 2×2 fiber optical splitters are connected to respective input sides of a third one of the 2×2 fiber optical splitters, output sides of the second one of the 2×2 fiber optical splitters is connected to first and second ones of the second ports, respectively, and output sides of the third one of the 2×2 fiber optical splitters are connected to third and fourth ones of the second ports, respectively.

8. The optical communication method according to claim 7, wherein one of the first ports receives a first optical signal having a first wavelength of the optical signals of different wavelengths from a first transmitter of optical transmitters, another of the first ports receives a second optical signal having a second wavelength of the optical signals of different wavelengths from a second transmitter of the optical transmitters, one of the second ports outputs the first optical signal to a plurality of first receivers of the optical receivers, and another of the second ports outputs the second optical signal to a plurality of second receivers of the optical receivers.

9. The optical communication method according to claim 7, wherein the multiplexed-wavelength optical signal has a first multiplexed-wavelength signal and a second multiplexed-wavelength signal, one of the first ports receives the first multiplexed-wavelength signal from first and second transmitters of optical transmitters, another of the first ports receives the second multiplexed-wavelength signal from third and fourth transmitters of the optical transmitters, one of the second ports outputs the first multiplexed-wavelength signal to a plurality of first receivers of the optical receivers, and another of the second ports outputs the second multiplexed-wavelength signal to a plurality of second receivers of the optical receivers.

* * * * *